Patented Nov. 15, 1949

2,488,289

UNITED STATES PATENT OFFICE 2,488,289

PROCESS FOR MAKING α:β-DI-[BENZIMID-AZYL-(2)]-ETHYLENES

Jules Meyer, Basel, Charles Graenacher, Riehen, and Franz Ackermann, Binningen, Switzerland, assignors to Ciba Limited, Basel, Switzerland, a Swiss firm No Drawing. Application November 21, 1945, Serial No. 630,118. In Switzerland December 21, 1944

8 Claims. (Cl. 260—240)

According to this invention α:β-di-[benzimidazyl-(2)]-ethylenes are made by treating α:β-di-[benzimidazyl-(2)]-ethane or a substitution product thereof or salt of either of these compounds at a raised temperature with a dyhydrogenating agent.

Among the substitution products of α:β-di-[benzimidazyl-(2)]-ethane coming into consideration as starting materials there may be mentioned, for example, the following: α:β-di-[benzimidazyl-(2)]-ethanes alkylated or aralkylated in the benzene nucleus or in the imino groups, such as α:β-di-[6-methyl-benzimidazyl-(2)]-ethane or α:β-di-[N-benzyl-benzimidazyl-(2)]-ethane; α:β-di-[benzimidazyl-(2)]-ethanes containing as substituents in the benzene nucleus halogen atoms or nitro or methoxy group, such as α:β-di-[6-chlorobenzimidazyl-(2)]-ethane, α:β-di-[6-nitrobenzimidazyl-(2)]-ethane or α:β-di-[6-methoxy-benzimidazyl-(2)]-ethane; and also α:β-di-[benzimidazyl-(2)]-ethanes containing sulpho groups as substituents in the benzene nucleus. There also come into consideration asymmetrically substituted α:β-di-[benzimidazyl-(2)]-ethanes.

As salts of the α:β-di-[benzimidazyl-(2)]-ethanes there may be mentioned, for example, the hydrochlorides or sulphates.

The α:β-di-[benzimidazyl-(2)]-ethanes mentioned above may be designated as di-benzimidazoles in which the two μ-carbon atoms of the imidazole nuclei are connected with one another through a —CH₂—CH₂— bridge. Furthermore, the parent materials mentioned above may also be designated as members selected from the group consisting of an imidazole of the formula

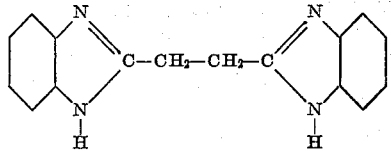

an N-substitution product thereof, a substitution product thereof containing at least one substituent in at least one benzene ring, and a salt of one of these compounds. Moreover, the diimidazoles serving as parent materials may be identified in the following manner: they may be represented by the formula

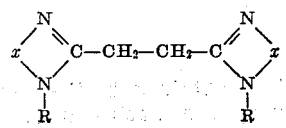

wherein $x$ is a ring of the benzene series in which two vicinal carbon atoms are bound to the nitrogen atoms of the imidazole nuclei, and R is a member selected from the group consisting of hydrogen, alkyl and aralkyl.

As dehydrogenating agents there come into consideration, for example, mild oxidizing agents. Examples of such agent are: Compounds of divalent mercury, such as mercuric acetate or mercuric oxide; potassium permanganate or pyrolusite; copper oxide or copper sulphate; hydrogen peroxide; selenium dioxide; platinum oxide; and more especially water-soluble ferric salts, such as ferric sulphate, ferric chloride or potassium ferricyanide; and finally organic compounds having an oxidizing action, such as nitro-compounds, for example, nitrobenzene.

The elements selenium and sulphur constitute a further group of dehydrogenating agents.

Lastly, there may also be mentioned as dehydrogenating agents dehydrogenation catalysts, for example, finely subdivided metals of the iron group, such as finely divided nickel, or cobalt, furthermore copper, platinum or palladium, used as such or supported on a carrier.

Especially effective dehydrogenating agents are mild oxidizing agents, that is oxidizing agents which do not destroy the di-benzimidazyl-ethylenes by further oxidation, and furthermore finely subdivided metals of the iron group. The preferred dehydrogenating agents are, however, mild oxidizing agents. These agents, especially ferric salts and mercuric salts, are characterized by a good yield of dehydrogenation product.

The most suitable dehydrogenating agents are, however, mild oxidizing agents such as ferric sulphate.

The treatment with the dehydrogenating agent is carried out at a raised temperature, preferably at a temperature exceeding 80° C. but lower than the decomposition temperature of the parent material, for example, at 85–250° C., advantageously in the presence of a solvent for the α:β-di-[benzimidazyl-(2)]-ethane compound, for example, with the addition of glacial acetic acid, a dilute mineral acid or water (when the starting materials contain sulphonic acid groups). Thus, for example, mercuric acetate, which is soluble in glacial acetic acid, can be caused to act upon a solution of one of the substituted ethanes mentioned above in glacial acetic acid, for example, at 100–150° C. Ferric sulphate, which has proved to be an especially advantageous dehydrogenating agent, can advantageously be caused to act at a temperature exceeding 100° C., for example, at 150–220° C., preferably with the addition of a dilute mineral acid, such as dilute sulphuric acid. Sulphuric acid is used in diluted form in order to exclude a sulphonating action. When, for the purpose of catalytic dehydrogenation, finely divided nickel is used as a dehydrogenating agent, the reaction can be brought about by heating at 250–300° C. with the exclusion of air, and molten 2-methyl-benzimidazole, for example, may be used as a solvent.

The products of the invention when in a dissolved or finely dispersed condition exhibit a more or less pronounced fluorescence, and also have a more or less marked affinity for cellulose fibers. By virtue of these properties the products can be used for improving, for example, for the optical bleaching of materials, especially cellulose fibres.

Among the $\alpha:\beta$-di-[benzimidazyl-(2)]-ethanes to be used as starting materials, $\alpha:\beta$-di-[benzimidazyl-(2)]-ethane is known, and indeed two processes for making this compound have been described. In accordance with one known process ortho-phenylene diamine is heated with succinic acid, whereby a crude product expressly referred to as being black is obtained. This baking process, apart from the fact that it yields a product of dark color, is also unsuitable for use on a commercial scale, because it leads to a final product (which as is known melts at over 310° C.) in a solid form which makes it difficult to remove the product from the reaction vessel. In the second known process succinic acid and ortho-phenylene diamine are heated for 7 hours in the presence of 4N hydrochloric acid, and the yield amounts to only 28 per cent of the calculated yield. On account of the poor yield this process is also precluded from commercial use.

It has now been found that salts of $\alpha:\beta$-di-[benzimidazyl-(2)]-ethane or of its substitution products are obtained in good yield by heating a suitable ortho-phenylene diamine with succinic acid or a functional derivative thereof in the presence of a mineral acid containing water until the content of the dibenzimidazyl compound no longer increases, and, if desired, causing an alkylating or aralkylating agent to act on the $\alpha:\beta$-di-[benzimidazyl-(2)]-ethane so obtained.

As "suitable" ortho-phenylene diamines to be used as starting materials there are to be understood those in which one amino group is primary and the other amino group is primary or secondary. Such ortho-phenylene diamines are, for example, ortho-phenylene diamine itself, 1-methyl-3:4-diaminobenzene, 1-isopropyl-3:4-diaminobenzene, 1-methoxy-3:4-diaminobenzene, 1-chloro-3:4-diamino-benzene and 1-nitro-3:4-diaminobenzene.

As functional derivatives of succinic acid there come into consideration, for example, the anhydride or an ester thereof.

The reaction of the ortho-phenylene diamines of the kind described above with succinic acid or a functional derivative thereof is conducted at a raised temperature, for example, at 100–140° C., in the presence of a mineral acid containing water, for example, with the addition of sulphuric acid of 40–50 per cent strength, or of hydrochloric acid of 20 per cent strength or stronger, and, if necessary, under pressure. The heating is continued until the content of the di-benzimidazyl compound formed no longer increases, which will generally be the case after heating for a period of 24–72 hours.

The alkylation or aralkylation of the $\alpha:\beta$-di-[benzimidazyl-(2)]-ethanes, which may be carried out if desired, may be brought about in the usual manner, for example, by treatment with an alkyl halide or aralkyl halide, such as benzyl chloride, advantageously with the addition of an acid-binding agent. For the alkylation there may also be used dialkyl sulphates, such as dimethyl sulphate.

Copending application Serial No. 515,024, filed December 20, 1943, now Patent No. 2,463,264, discloses that materials, particularly textile materials, can be improved by bringing onto these materials at any desired stage of their manufacturing or improving process compounds of the general formula

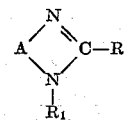

wherein A stands for an aromatic nucleus which, if desired, may be substituted, $R_1$ stands for hydrogen or a substituent, for example, a benzyl radical or a hydroxyalkyl radical, and R stands for an alkyl radical unsaturated in $\alpha:\beta$-position, an aralkyl radical (including aralkyl radicals having unsaturated side chains), a heterocyclic radical or a radical containing a heterocycle and wherein R may also be substituted, preferably in the form of their water-soluble derivatives, which compounds show a blue to violet fluorescence in the daylight or in the ultraviolet light and do not or hardly at all stain the material.

The following examples illustrate the invention, the parts being by weight:

*Example 1*

A solution of 23.4 parts of $\alpha:\beta$-di-[benzimidazyl-(2)]-ethane of the formula

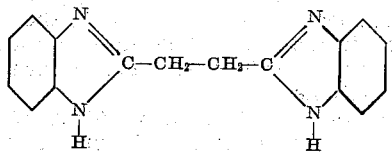

in 180 parts of glacial acetic acid is mixed with a solution of 61.2 parts of mercuric acetate in 240 parts of glacial acetic acid, and the mixture is heated, while stirring, for 3 hours at the boil in a refluxing apparatus. The acetic acid is then completely removed by distillation under reduced pressure. The dry yellow-brown residue intermingled with some metallic mercury is extracted by boiling with hydrochloric acid of 10 per cent. strength until all the $\alpha:\beta$-di-[benzimidazyl-(2)]-ethylene has been extracted. The hydrochloric acid extracts are united, and hydrogen sulphide is introduced into the combined extracts while heating, in order to remove traces of dissolved mercury in the form of sulphide. The hot filtrate is mixed with ammonia to give a weakly alkaline reaction, and precipitate the pale yellowish colored $\alpha:\beta$-di-[benzimidazyl-(2)]-ethylene of the formula

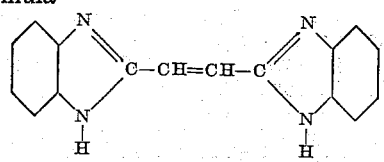

The product so obtained in then separated by filtering with suction, washed until neutral, and dried at 100° C. It is a feebly yellowish colored powder. The yield amounts to 21 parts.

Instead of mercuric acetate, another mercuric salt such as mercuric propionate may be used.

The aforesaid α:β-di-[benzimidazyl-(2)]-ethane used as starting material is advantageously prepared in the following manner:

64.8 parts of ortho-phenylene diamine and 36 parts of succinic acid are added with the exclusion of air to 240 parts of sulphuric acid of 50 per cent. strength. The whole is heated for 48–72 hours in a reflux apparatus at 105–110° C. then diluted with water, allowed to cool to 10–20° C. and advantageously allowed to stand for 10–20 hours. The α:β-di-[benzimidazyl-(2)]-ethane sulphate, which separates, is removed by filtration, washed with a little water, and dried.

The yield is over 90 per cent. of the theoretical yield. α:β-Di-[benzimidazyl-(2)]-ethane sulphate forms a colorless crystalline powder, which is soluble in acidified water. The base may be separated from the solution by means of an alkali, for example, ammonia.

*Example 2*

1.8 parts of α:β-di-[N-benzyl-benzimidazyl-(2)]-ethane (obtainable in the usual manner by the treatment of α:β-di-[benzimidazyl-(2)]-ethane with benzyl chloride) are dissolved in 15 parts of glacial acetic acid, and then mixed with a solution of 2.8 parts of mercuric acetate in 15 parts of glacial acetic acid. The clear solution is heated for 3 hours at 140–145° C., and after a short time fine gold-yellow needles precipitate. After the 3 hours the solution has become clear again and metallic mercury collected at the bottom. The supernatant clear solution is carefully poured off, and the glacial acetic acid is removed therefrom by distillation under reduced pressure. The gold-yellow colored residue is digested with a dilute aqueous solution of ammonia, and then filtered. The filter residue is washed until neutral, and dried at 100° C.

By recrystallisation from alcohol α:β-di-[N-benzyl-benzimidazyl-(2)]-ethylene of the formula

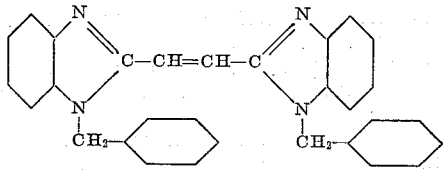

is obtained in the form of a pale yellow fine crystalline powder.

*Example 3*

A solution of 3.5 parts of α:β-di-[6-nitrobenzimidazyl-(2)]-ethane in 50 parts of glacial acetic acid is mixed with a solution of 6.8 parts of mercuric acetate in 30 parts of glacial acetic acid. The clear solution is heated for 3 hours at 135–140° C. and in a short time a yellow colored precipitate is formed. The glacial acetic acid is then distilled under reduced pressure, and the residue is extracted by boiling for a short time in 75 parts of alcohol and 16 parts of a caustic soda solution of 10 per cent. strength, the mercury remaining undissolved. The whole is filtered, and the alcohol is removed by distillation. The residue is taken up in water, the suspension is neutralized with a mineral acid, and filtered. The filter residue is well washed with water, and then dried at 100° C.

The α:β-di-[6-nitrobenzimidazyl-(2)]-ethylene of the formula

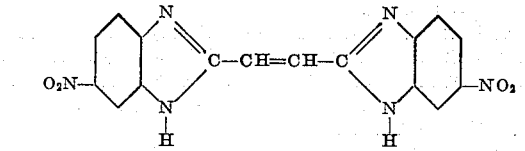

so obtained is a strongly yellow colored powder.

In a similar manner α:β-di-[6-methoxy-benzimidazyl-(2)]-ethane may be dehydrogenated.

The aforesaid α:β-di-[6-nitro-benzimidazyl-(2)]-ethane used as starting material may be prepared in the following manner:

33 parts of 1-nitro-3:4-diaminobenzene are stirred with 500 parts of sulphuric acid of 40 per cent. strength. 12 parts of succinic acid are added, and the whole is gently boiled for about 24 hours in a reflux apparatus. The whole is then diluted with water and allowed to cool. The condensation product which separates is removed by filtration, washed with water, and dissolved in a hot dilute solution of caustic soda, whereupon the sodium salt separates in the form of yellow needles. The latter are isolated by filtration, washed with a solution of sodium chloride, dissolved in a dilute caustic soda solution, precipitated with acetic acid, filtered, washed with water, and dried.

The resulting α:β-di-[6-nitro-benzimidazyl-(2)]-ethane is a pale colored powder. It dissolves in a dilute caustic soda solution with a yellow coloration, and gives a colorless solution in glacial acetic acid.

The α:β-di-[6-methoxy-benzimidazyl-(2)]-ethane, which is also mentioned above as a starting material, can be obtained in a manner similar to that described in Example 7 below for preparing α:β-di-[6-methyl-benzimidazyl-(2)]-ethane.

*Example 4*

3.3 parts of α:β-di-[6-chlorobenzimidazyl-(2)]-ethane are dissolved in 25 parts of glacial acetic acid and 6.8 parts of mercuric acetate are dissolved in 30 parts of glacial acetic acid. The united solutions are then heated for 3 hours at 135–140° C., and in a short time an orange-red precipitate is formed. The glacial acetic acid is then distilled under reduced pressure. The grey-yellow residue is extracted by boiling with a large quantity of hydrochloric acid of 10 per cent. strength, whereby the sparingly soluble dihydrochloride of the dehydrogenation product is formed. The whole is filtered hot and allowed to cool, whereupon the dihydrochloride precipitates in the form of bright yellow crystals, which are then separated by filtration. In order to produce the free base the filter residue is dissolved in hot alcohol with the addition of a concentrated solution of ammonia, and the clear solution is stirred into a large excess of water, whereupon the pale yellow base flocculates. The whole is filtered, and the filter residue is washed with water until neutral, and dried at 100° C.

The α:β-di-[6-chlorobenzimidazyl-(2)]-ethylene of the formula

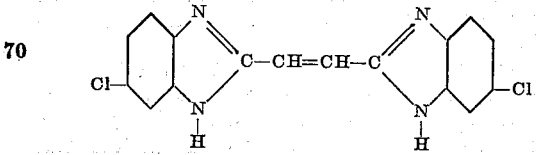

thus purified is a pale yellow powder.

In a quite similar manner α-[benzimidazyl-(2)]-β-[6-chlorobenzimidazyl-(2)]-ethane can be dehydrogenated.

The α:β-di-[6-chlorobenzimidazyl-(2)]-ethane used above as starting material can be obtained in a similar manner to that described in Example 7 below for preparing α:β-di-[6-methyl-benzimidazyl-(2-)]-ethane.

The α-[benzimidazyl-(2)]-β-[6-chlorobenzimidazyl-(2)]-ethane also mentioned above as a starting material can be obtained in the following manner:

19 parts of β-[benzimidazyl-(2)]-propionic acid and 14 parts of 1-chloro-3:4-diaminobenzene are boiled in a reflux apparatus with 200 parts of hydrochloric acid of 15 per cent. strength for 48 hours, and then allowed to cool.

The procedure is the same as that described in Example 7 below for preparing α:β-di-[6-methyl-benzimidazyl-(2)]-ethane. There is thus obtained α-[benzimidazyl-(2)]-β-[6-chlorobenzimidazyl-(2)]-ethane in the form of a colorless powder, which is soluble in dilute hydrochloric acid or sulphuric acid.

Example 5

A solution of 8 parts of α:β-di-[6-isopropyl-benzimidazyl-(2)]-ethane dihydrochloride in 50 parts of glacial acetic acid is mixed with a solution of 14 parts of mercuric acetate in 60 parts of glacial acetic acid. The clear solution is heated, while stirring, for 3 hours at 135–140° C., whereupon a yellow crystalline precipitate forms in a short time.

The glacial acetic acid is then distilled under reduced pressure. The black-yellow residue is extracted by boiling with 25 parts of alcohol and 7 parts of a caustic soda solution of 10 per cent. strength, whereupon the whole is dissolved with the exception of the mercury. The mixture is filtered, the alcohol is removed from the filtrate by distillation, the residue is taken up in water, neutralized with sulphuric acid of 10 per cent. strength, and filtered. The filter residue is washed, and dried at 100° C.

In this manner α:β-di-[6-isopropyl-benzimidazyl-(2)]-ethylene of the formula

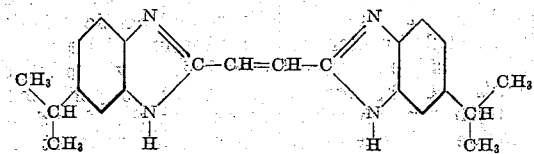

is obtained in the form of a pale yellow powder.

The α:β-di-[6-isopropyl-benzimidazyl-(2)]-ethane used above as starting material can be obtained in a manner similar to that described in Example 7 below for preparing α:β-di-[6-methyl-benzimidazyl-(2)]-ethane.

Example 6

180 parts of α:β-di-[benzimidazyl-(2)]-ethane sulphate are heated in an autoclave, while stirring, with 45 parts of water, 405 parts of crystalline ferric chloride (FeCl₃.6H₂O) and 50 parts of concentrated sulphuric acid for 3 hours at 200–205° C.

After cooling, the reaction mixture is triturated with 4500 parts of water and allowed to stand for 1–2 hours. The finely pulverized reaction product is then separated by filtering with suction, and washed with water until a test portion no longer produces a blue coloration with potassium ferrocyanide.

The crude product so obtained is a pale yellow-olive powder, which consists mainly of the sulphate of the dehydrogenation product produced.

In order to obtain the free base, the crude product is extracted by boiling with a mixture of 900 parts of a caustic soda solution of 14 per cent. strength and 4000 parts of alcohol for 1 hour, the dehydrogenation product passing into solution. The cooled solution is filtered to remove solid constituents, the filter residue is washed with alcohol containing sodium hydroxide, and the alcoholic filtrate is evaporated to dryness. The residue is taken up in water, the suspension neutralized with mineral acid and filtered. The α:β-di-[benzimidazyl-(2)]-ethylene so obtained is a pale beige colored powder, solutions of which in alcohol exhibit a strong blue fluorescence in ultra-violet light.

Example 7

2.7 parts of α:β-di-[6-methyl-benzimidazyl-(2)]-ethane are heated in an autoclave, while stirring, with 20 parts of water, 8.1 parts of crystalline ferric chloride (FeCl₃.6H₂O) and 1.5 parts of concentrated sulphuric acid for 3 hours at 200–205° C.

After cooling, the reaction mixture is digested with about 60 parts of water, the reaction product which separates is isolated by filtration, and washed with water until a test portion produces no blue coloration with potassium ferrocyanide. The crude product so obtained can be recrystallized from alcohol rendered weakly alkaline with ammonia. α:β-Di-[6-methyl-benzimidazyl-(2)]-ethylene of the formula

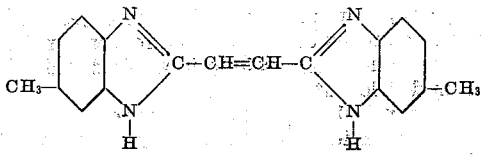

is obtained in good yield in the form of a crystalline feebly pale yellow colored product.

In a quite analogous manner N:N′-dimethyl-α:β-di-[benzimidazyl-(2)]-ethane can be dehydrogenated.

The α:β-di-[6-methyl-benzimidazyl-(2)]-ethane mentioned above as starting material may be prepared in the following manner:

24.4 parts of 1-methyl-3:4-diaminobenzene and 12.4 parts of succinic acid are boiled in a reflux apparatus with 200 parts of hydrochloric acid of 15 per cent. strength for 48 hours. The whole is allowed to cool, the crystals which separate are isolated by filtration, and, if necessary, the remainder of the product is recovered from the filtrate by the addition of sodium chloride or concentrated sulphuric acid. The isolated product is then washed with a solution of sodium chloride, and dried.

The α:β-di-[6-methyl-benzimidazyl-(2)]-ethane hydrochloride so obtained is a colorless crystalline powder. It can be further purified from dilute hydrochloric acid. From the hydrochloric acid solution the base can be precipitated in the form of a colorless powder by means of an alkali, for example, sodium carbonate.

The N:N′-dimethyl-α:β-di-[benzimidazyl-(2)]-ethane also mentioned above as a starting material can be prepared in the following manner:

40 parts of dimethyl sulphate are added dropwise in the course of 2-4 hours, while stirring, to a solution of 26.2 parts of α:β-di-[benzimidazyl-(2)]-ethane in 800 parts of ethyl alcohol and 140 parts of a caustic soda solution of 30 per cent. strength. After cooling, the precipitated N:N'-dimethyl-α:β-di-[benzimidazyl - (2)] - ethane is separated by filtration, washed with alcohol and water, and dried.

It is a colorless crystalline powder, which, if necessary, may be further purified from alcohol.

*Example 8*

3.5 parts of α:β-di-[6-nitrobenzimidazyl-(2)]-ethane are heated with 30 parts of water, 8.1 parts of crystalline ferric chloride (FeCl₃.6H₂O) and 3 parts of concentrated sulphuric acid in a closed vessel, while stirring, for 3 hours at 135–140° C.

After cooling, the reaction mixture is filtered with suction and the greenish yellow filter residue is washed with water until a test portion no longer produces a blue coloration with potassium ferrocyanide.

The dried filter residue is purified by rapidly extracting it by boiling with a mixture of 95 parts of alcohol and 12 parts of a caustic soda solution of 10 per cent. strength and removing the undissolved material by filtration. The filtrate is then neutralized with a mineral acid, the alcohol is removed by distillation, the residue is taken up in a little water, and filtered. The filter residue is washed with water and dried.

The α:β-di-[6-nitrobenzimidazyl-(2)]-ethylene so obtained is a strongly yellow colored powder.

*Example 9*

10 parts of α:β-di-[benzimidazyl-(2)]-ethane are dissolved in a melt of 100 parts of 2-methyl-benzimidazole, and the mixture is then mixed with 10 parts of a nickel catalyst with the exclusion of air and gradually heated to 260-300° C. A lively evolution of hydrogen occurs. As soon as this evolution has ceased the melt is allowed to cool, and then boiled with alcohol to dissolve the 2-methyl-benzimidazole. The residue is then extracted by boiling with 250 parts of alcohol and 20 parts of a caustic soda solution of 10 per cent. strength. The imidazole product passes into solution, and is freed from nickel by filtration. By pouring the filtrate into water and neutralizing the alkali with sulphuric acid, the crude α:β-di-[benzimidazyl-(2)]-ethylene is precipitated, and the latter is washed with water and then dried. By redissolution in alcohol with the addition of a little sodium hydroxide and recrystallization from alcoholic hydrochloric acid, the new compound is purified and obtained in the form of a pale yellowish colored crystalline powder.

*Example 10*

20 parts of α:β-di-[benzimidazyl-(2)]-ethane are dissolved in 40 parts of sulphuric acid monohydrate, and sulphonated at 15–25° C. with 100 parts of fuming sulphuric acid of 24 per cent. strength. When a test portion of the sulphonation mixture dissolves to give a clear solution in a sodium carbonate solution of 10 per cent. strength, the reaction mixture is poured onto 500 parts of ice. The precipitated disulphonic acid is separated by filtering with suction, washed until neutral, the suspension is neutralized with caustic soda solution, and the resulting solution is evaporated to dryness. 9.2 parts of the sodium α:β-di-[benzimidazyl-(2)]-ethane disulphonate of the formula

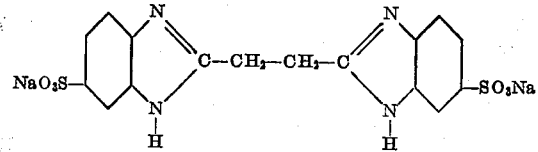

so obtained are dissolved in 500 parts of water, and rendered weakly alkaline with 40 parts of a ½N solution of caustic soda. 18 parts of potassium ferricyanide are then added, and the solution is heated at the boil for 12 hours in a reflux apparatus.

After cooling, a small quantity of a brown precipitate is removed by filtration, and the disulphonic acid is precipitated by acidifying the filtrate with hydrochloric acid. The disulphonic acid is separated by filtration, and thoroughly washed with water. The aqueous suspension thereof is neutralized with caustic soda solution, and the resulting solution is evaporated to dryness.

The pale yellowish colored reaction product possesses a fluorescent property similar to that of sodium α:β-di-[benzimidazyl-(2)]-ethylene disulphonate, and can be used as an optical bleaching agent.

*Example 11*

540 parts of α:β-di-[benzimidazyl-(2)]-ethane sulphate are heated in an autoclave, while stirring, with 1741 parts of an aqueous ferric sulphate solution of 52 per cent. strength. 150 parts of water and 152 parts of pure concentrated sulphuric acid for 4–5 hours at 210–215° C.

After cooling, the reaction mixture is vigorously stirred with 5000 parts of water, and allowed to stand for a few hours. The finely pulverulent reaction product is separated by filtering with suction, and washed with water (about 70,000 parts) until a test portion no longer produces a blue coloration with potassium ferrocyanide.

The crude product so obtained is a pale yellow powder, which consists mainly of the sulphate of the dehydrogenation product formed.

For the purpose of purification the crude product is boiled at least once with a mixture of 1200 parts of ½N sulphuric acid and 1200 parts of water in a reflux apparatus for 20 minutes. After cooling the solution, the resulting magma is filtered with suction and washed with water until a test portion no longer produces a blue coloration with potassium ferrocyanide.

In order to obtain the free base the still moist paste (the filter residue) is stirred for a few hours with 1200 parts of water and 480 parts of a concentrated solution of ammonia. The alkaline magna is then filtered with suction, washed until the washing water has a neutral reaction, and the filter residue dried at 120–130° C.

The α:β-di-[benzimidazyl-(2)]-ethylene so obtained is a faintly yellowish colored powder, solutions of which in alcohol exhibit a strong blue fluorescence in ultra-violet light.

α:β - Di-[6-methyl-benzimidazyl-(2)]-ethane of the formula

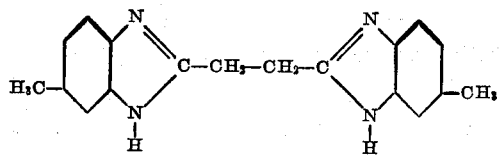

What we claim is:

1. Process for the manufacture of an α:β-di-[benzimidazyl-(2)]-ethylene, which comprises heating a member selected from the group consisting of an imidazole of the formula

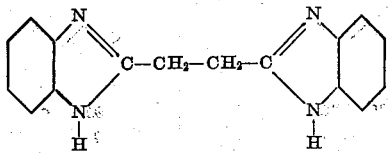

N-substitution products thereof containing at least one N-alkyl radical, substitution products thereof containing an alkyl group in at least one benzene ring, substitution products thereof containing a halogen atom in at least one benzene ring, and salts of these compounds, with an oxidizing agent selected from the group consisting of water-soluble ferric salts and mercuric salts at a temperature ranging from 100–250° C.

2. Process for the manufacture of an α:β-di-[benzimidazyl-(2)]-ethylene, which comprises heating a member selected from the group consisting of an imidazole of the formula

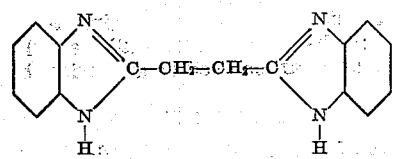

N-substitution products thereof containing at least one N-alkyl radical, substitution products thereof containing an alkyl group in at least one benzene ring, substitution products thereof containing a halogen atom in at least one benzene ring, and salts of these compounds, with a water-soluble ferric salt at a temperature ranging from 100–250° C.

3. Process for the manufacture of an α:β-di-[benzimidazyl-(2)]-ethylene, which comprises heating a member selected from the group consisting of an imidazole of the formula

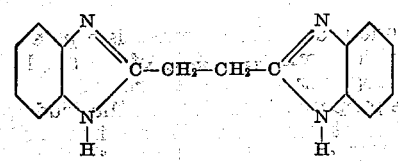

N-substitution products thereof containing at least one N-alkyl radical, substitution products thereof containing an alkyl group in at least one benzene ring, substitution products thereof containing a halogen atom in at least one benzene ring, and salts of these compounds, with ferric sulphate in the presence of a mineral acid containing water at a temperature ranging from 150–220° C.

4. Process for the manufacture of an α:β-di-[benzimidazyl-(2)]-ethylene, which comprises heating a member selected from the group consisting of an imidazole of the formula

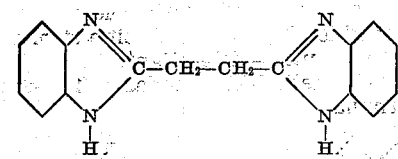

N-substitution products thereof containing at least one N-alkyl radical, substitution products thereof containing an alkyl group in at least one benzene ring, substitution products thereof containing a halogen atom in at least one benzene ring, and salts of these compounds, with a mercuric salt at a temperature ranging from 100–250° C.

5. Process for the manufacture of an α:β-di-[benzimidazyl-(2)]-ethylene, which comprises heating a member selected from the group consisting of an imidazole of the formula

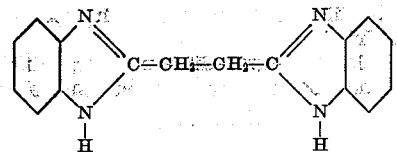

N-substitution products thereof containing at least one N-alkyl radical, substitution products thereof containing an alkyl group in at least one benzene ring, substitution products thereof containing a halogen atom in at least one benzene ring, and salts of these compounds, with mercuric acetate in the presence of acetic acid at a temperature ranging from 100–150° C.

6. Process for the manufacture of α:β-di-[6-chloro-benzimidazyl-(2)]-ethylene of the formula

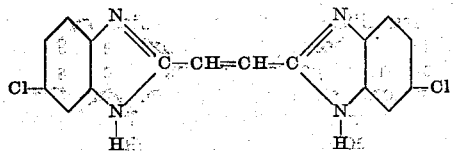

which comprises heating α:β-di-[6-chloro-benzimidazyl-(2)]-ethane of the formula

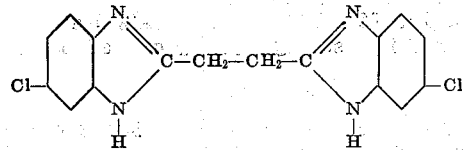

with mercuric acetate in the presence of acetic acid to a temperature ranging from 100–150° C.

7. Process for the manufacture of a sulphate of the α:β-di-[benzimidazyl-(2)]-ethylene of the formula

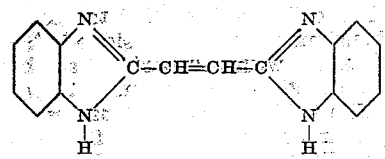

which comprises heating a sulphate of the α:β-di-[benzimidazyl-(2)]-ethane of the formula

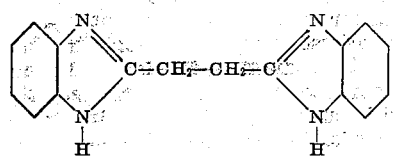

with ferric sulphate in presence of dilute sulphuric acid to a temperature ranging from 150–220° C.

8. Process for the manufacture of a sulphate of the α:β-di-[6-methyl-benzimidazyl-(2)]-ethylene of the formula

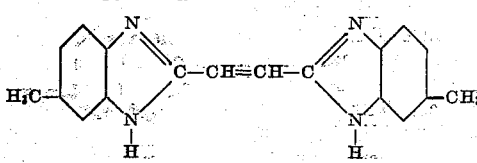

which comprises heating a sulphate of the α:β- di-[6-methyl-benzimidazyl-(2)]-ethane of the formula

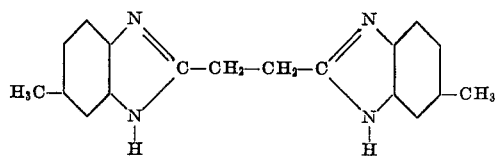

with ferric sulphate in presence of dilute sulphuric acid to a temperature ranging from 150–220° C.

JULES MEYER.
CHARLES GRAENACHER.
FRANZ ACKERMANN.

REFERENCES CITED

The following references are of record in the file of this patent:

Richter, "Textbook of Organic Chemistry," John Wiley & Sons, New York, N. Y., 1938, page 653.

Shriner et al., J. Am. Chem. Soc., 63, pages 2277 and 2278 (August 1941).

Brunings et al., J. Am. Chem. Soc., 66, pages 337 and 342 (March 1944).